United States Patent Office 3,541,866
Patented Nov. 24, 1970

3,541,866
VIBRATING STRING ACCELEROMETERS
Raymond Mathey, Paris, and Bernard Picardat, Urville, France, assignors to CSF-Compagnie Generale de Telegraphie Sans Fil, a corporation of France
Filed Feb. 13, 1968, Ser. No. 705,162
Claims priority, application France, Feb. 24, 1967, 96,432
Int. Cl. G01p 15/10
U.S. Cl. 73—517                                        3 Claims

ABSTRACT OF THE DISCLOSURE

A vibrating string accelerometer, for the measurement of the acceleration of a body by measuring the difference in the resonance frequencies of two vibrating strings, associated with the said body wherein the sum of these two frequencies is kept constant by passing through the two strings the same heating current controlled by the sum of these frequencies.

---

The present invention relates to vibrating string accelerometers permitting them easurement of an acceleration by measuring the difference in the vibration frequencies of two strings supporting a mass subjected to this acceleration.

Such accelerometers comprise, as known in the art, a mass supported by two tensioned strings connected to a frame which is rigidly associated with the moving body, the acceleration of which is to be measured.

For the accelerometer to measure the acceleration within a wide range in a convenient manner, it is necessary to make the difference between the vibrating string frequencies proportional to the acceleration, i.e. to make the sum of these two frequencies constant.

The devices proposed to this effect up to the prevent were expensive, complicated and introduced into the measuring circuit a variable unbalance which was very difficult to control and made the measurements inaccurate.

It is an object of this invention to eliminate these drawbacks.

According to the invention there is provided a vibrating string accelerometer for measuring the acceleration of a body in a predetermined direction, comprising: a frame capable of being fixed to said body; two identical vibrating strings parallel to said direction; a mass fixed to said frame by said string; means form maintaining said strings in vibration at a frequency equal to the respectively resonance frequencies of said two strings; supply means for supplying a heating current to said two strings in series, said supply means being floatingly mounted; control means for controlling said current to keep constant the sum of said resonance frequencies of said two strings; and decoupling means between said supply means and said means for maintaining said strings in vibration.

Figure 1:
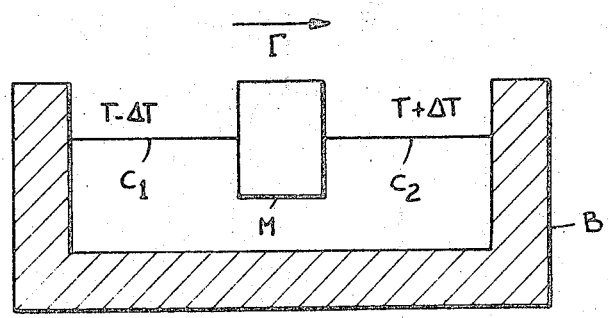
Figure 2:
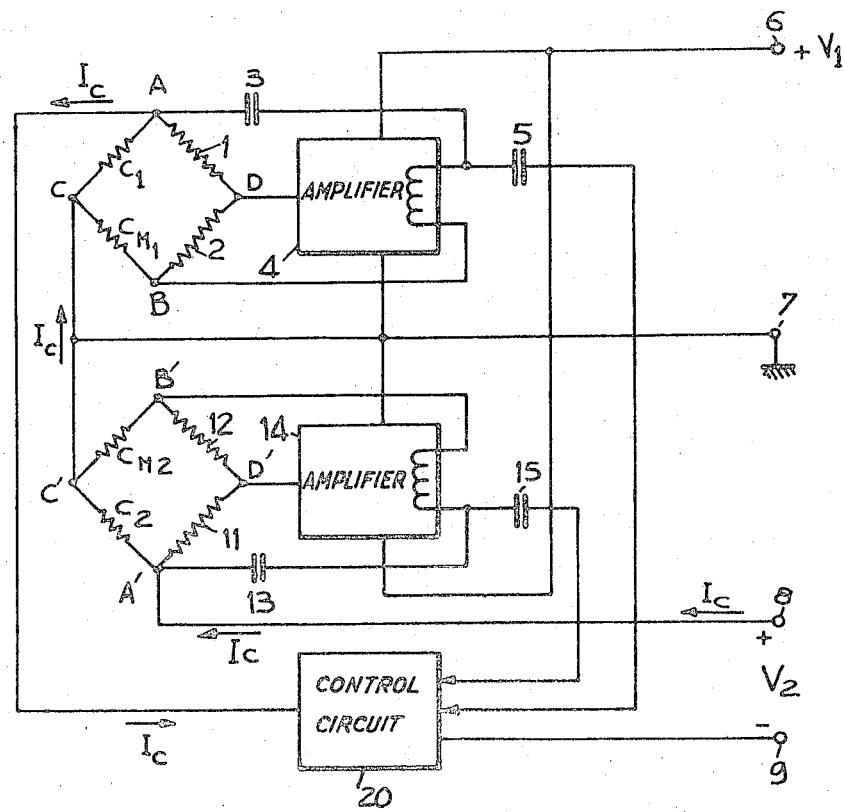
Figure 3:
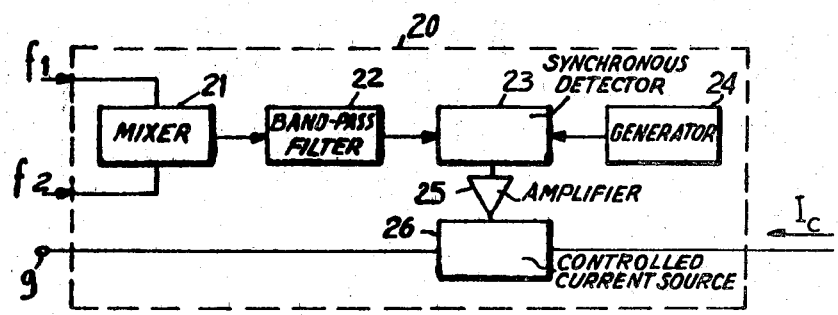
Figure 4:
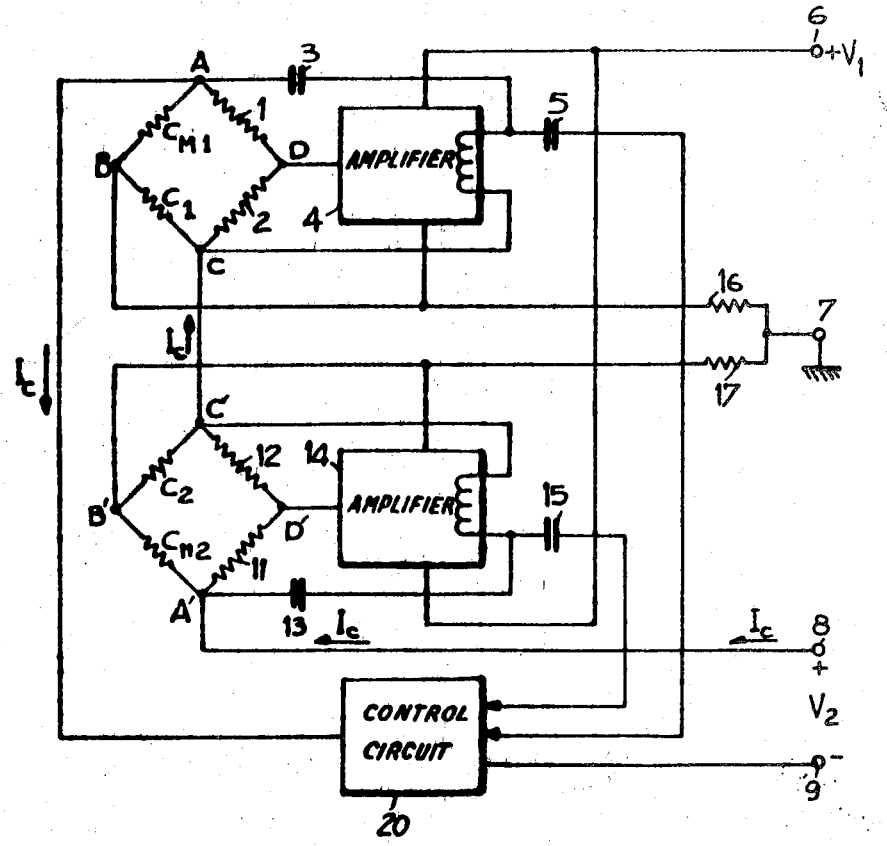
Figure 5:
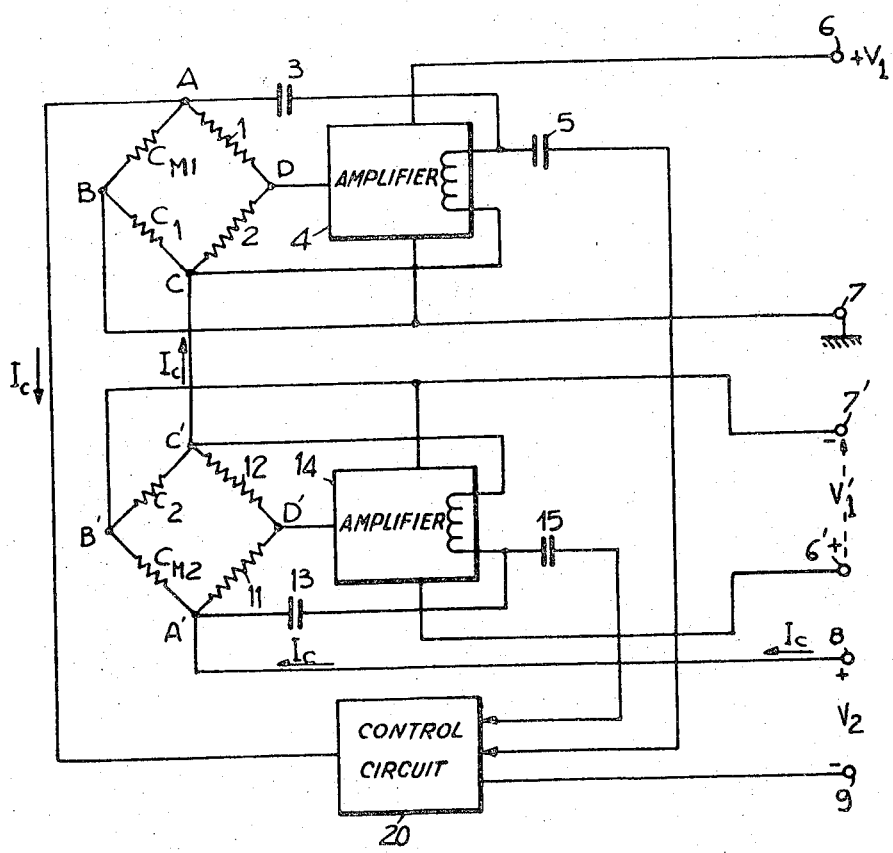

For a better understanding of the invention and to show how the same may be carried into effect reference will be made to the drawings accompanying the following specification and in which:

FIG. 1 shows the basic diagram of a vibrating string accelerometer;
FIG. 2 shows a first embodiment of the invention;
FIG. 3 shows a detail of the circuit of FIG. 2; and
FIGS. 4 and 5 show further embodiments of the invention.

In FIG. 1, a mass M is fixed to a frame B through two identical vibrating strings $C_1$ and $C_2$. In the absence of an acceleration, the tensions T and the lengths of the strings $C_1$ and $C_2$ are the same.

When the frame B is subject to an acceleration $\vec{\Gamma}$ parallel to the strings $C_1$ and $C_2$, the string $C_1$ is subjected to a tension $T-\Delta T$ and the string $C_2$ to a tension $T+\Delta T$.

If the strings are then made to vibrate at their respective resonance frequencies, $f_1$ and $f_2$, the calculation shows that $$f^2{}_2 - f^2{}_1 = k\Delta T = K\Gamma$$

where $k$ and $K$ are constants dependent on the characteristics of the strings.

If the sum $f_1+f_2$ is kept constant and equal to a value $f_0$, it follows also that:

$$f_2 - f_1 = \frac{K\Gamma}{f_0}$$

and the difference $f_2-f_1$ is proportional to the value of the acceleration $\Gamma$.

The strings $C_1$ and $C_2$ are of metal or metallized and an electric current can be caused to flow therein, thus altering the tension of the string so as to keep the value $f_1+f_2$ equal to $f_0$, when $f_1$ and $f_2$ vary.

FIG. 2 shows a first embodiment of the accelerometer according to the invention.

The string $C_1$ is placed in a constant transverse magnetic field and forms the first arm of a bridge comprising two equal resistance 1 and 2, and a third resistance formed preferably by a string $C_{M1}$, having the same electrical characteristics as the string $C_1$, but not subjected to vibration. The string $C_{M1}$ is called a "dead" string.

The apex C of the bridge is grounded an the apex D is connected to the input of an oscillating amplifier 4. The signal at the output of the amplifier 4, taken for example from the secondary of an output transformer, is applied between the apices A and B of the bridge. This arrangement, known per se, makes it possible to maintain the string $C_1$ in vibration at the frequency $f_1$ as a function of the string tension.

Similarly, the string $C_2$ is maintained in vibration at its resonance frequency $f_2$ by means of a similar arrangement comprising a bridge A'C'B'D', comprising equal resistance 11 and 12 and the dead string $C_{M2}$, having identical electrical characteristics as the string $C_2$, and an oscillating amplifier 14.

The amplifiers 4 and 14 are supplied by a voltage $+V_1$ between the terminals 6 and 7, the latter being connected to ground.

The heating of the strings $C_1$ and $C_2$ is ensured by means of the current $I_c$ flowing through them. In this embodiment, the current is a direct current, but this is not limitative of the invention.

The current $I_c$ is supplied by a source $V_2$ between the terminals 8 and 9, wherein this supply is mounted floatingly. The value of the current $I_c$ is fixed by a control circuit 20, which receives the signals at the frequencies $f_1$ and $f_2$ taken from the outputs of the amplifiers 4 and 14 through capacitors 5 and 15, respectively. The circuit 20 controls the value of the current $I_c$ in such a way that the sum $f_1+f_2$ remains constant.

Capacitors 3 and 13 ensure the decoupling between the heating circuit and the amplifiers 4 and 14, respectively.

Owing to the floating arrangement of $V_2$, the same current $I_c$ flows through the two strings $C_1$ and $C_2$, which makes it possible to vary in an identical manner the mechanical characteristics of these two strings $C_1$ and $_2$, when $I_c$ varies, and thus to preserve an excellent precision within a wide range of accelerations to be measured. Owing to the floating arrangement, the terminal 8 carries a potential $+\epsilon$ which is variable relative to earth.

FIG. 3 shows, by way of example, a possible embodiment of the control circuit 20. The signals with the frequencies $f_1$ and $f_2$ are applied to a mixer 21, which supplies among others a signal with the frequency $f_1+f_2$. A bandpass filter 22 passes the frequencies between $f_0-\Delta f$ and $f_0+\Delta f$, wherein $\Delta f$ is so chosen that the signal with the frequency $f_1+f_2$ is transmitted and that the harmonics are eliminated. A synchronous detector 23 receives on the one hand the signal with the frequency $f_1+f_2$ and on the other hand a reference signal with the frequency $f_0$, supplied by a generator 24.

The error voltage supplied by the detector 23 is amplified by the amplifier 25 and controls the current source 26.

In one embodiment of the accelerometer of FIG. 2, the following elements have been used:

Resistors 1, 2, 11 and 12—220 ohms
Capacitors 3 and 13—680 μf.

FIG. 4 shows a second embodiment of the accelerometer according to the invention, wherein the accuracy of the measurement is improved.

The same reference numerals indicate the same elements as in FIG. 2.

When a heating current is passed through the strings $C_1$ and $C_2$, the electrical characteristics of these strings are slightly modified and these are then no longer completely identical with the strings $C_{M1}$ and $C_{M2}$. This results in a slight unbalance of each of the bridges.

In order to avoid this, the same heating current $I_c$ is passed not only through the strings $C_1$ and $C_2$, but also through the strings $C_{M1}$ and $C_{M2}$. The apices C and C' of the two bridges are common to both vibrating strings and apices B and B' are connected to ground through resistors 16 and 17, respectively, which prevent the strings $C_1$ and $C_2$ from being short-circuited.

Owing to the floating arrangement of the supply $V_2$, the four strings $C_1$, $C_2$, $C_{M1}$ and $C_{M2}$ carry the same current $I_c$ and no unbalance is introduced when $I_c$ varies, since the electrical characteristics of the four strings vary in the same way. In one embodiment, the resistors 16 and 17 were equal to 180 ohms.

FIG. 5 shows the diagram of a modification of the accelerometer of FIG. 4.

The resistors 16 and 17 are omitted. The point C is connected to ground and the amplifier 4 is supplied from a source $V_1$ between the terminals 6 and 7.

A second supply is floating and provides a voltage $V'_1 = V_1$ which is applied between the terminals 6' and 7'. The point B', connected to the terminal 7', has a low and variable potential $+\epsilon'$, relative to ground.

This modification makes it possible to eliminate any possibility of cupling through the resistors 17 and 16 between the two circuits maintaining the vibration.

Of course, the invention is not limited to the embodiments hereinbefore described which were given solely by way of example.

What is claimed is:

1. A vibrating string accelerometer, for measuring the acceleration of a body in a predetermined direction, comprising: a frame capable of being fixed to said body; two identical vibrating strings parallel to said direction; a mass fixed to said frame by said strings extending respectively in opposite directions with respect to said mass; two circuits for respectively maintaining said strings in vibration at their respective resonance frequencies, each of said circuits comprising a bridge having four apices and four arms respectively comprising two identical resistances, one of said vibrating strings and a dead string electrically identical to said vibrating string, an amplifier having an input connected to a first of said apices and an output connected between a second and third opposite apices of said bridge, the fourth of said apices being between said vibrating string and said dead string, and a supply source for supplying said amplifier; supply means for supplying a heating current to said two strings in series; control means for controlling said current to keep constant the sum of said responance frequencies of said two strings; and decoupling means between said supply means and said circuits; said fourth apices of said bridges being connected to ground and said supply means being floatingly connected between said respective apices of said bridges respectively connected to said vibrating strings oppositely to said fourth apices.

2. A vibrating string accelerometer, for measuring the acceleration of a body in a predetermined direction, comprising: a frame capable of being fixed to said body; two identical vibrating strings parallel to said direction; a mass fixed to said frame by said strings extending respectively in opposite directions with respect to said mass; two circuits for respectively maintaining said strings in vibration at their respective resonance frequencies, each of said circuits comprising a bridge having four apices and four arms respectively comprising two identical resistances, one of said vibrating strings and a dead string electrically identical to said vibrating string, an amplifier having an input connected to a first of said apices and an output connected between a second and third opposite apices of said bridge, the fourth of said apices being between said vibrating string and said dead string and a supply source for supplying said amplifier; supply means for supplying a heating current to said two strings in series; control means for controlling said current to keep constant the sum of said resonance frequencies of said two strings; and decoupling means between said supply means and said circuits; said second apices of said bridges being interconnected, said fourth apices of said bridges being connected to ground through identical resistances and said supply means being floatingly connected between said third apices of said bridges.

3. A vibrating string accelerometer, for measuring the acceleration of a body in a predetermined direction, comprising: a frame capable of being fixed to said body; two identical vibrating strings parallel to said direction; a mass fixed to said frame by said strings extending respectively in opposite directions with respect to said mass; two circuits for respectively maintaining said strings in vibration at their respective resonance frequencies, each of said circuits comprising a bridge having four apices and four arms respectively comprising two identical resistances, one of said vibrating strings and a dead string electrically identical to said vibrating string, an amplifier having an input connected to a first of said apices and an output connected between a second and third opposite apices of said bridge, the fourth of said apices being between said vibrating string and said dead string and a supply source for supplying said amplifier; supply means for supplying a heating current to said two strings in series; control means for controlling said current to keep constant the sum of said resonance frequencies of said two strings; and decoupling means between said supply means and said circuits; said second apices of said bridges being interconnected, said fourth apex of one of said bridges being connected to ground, said fourth apex of the other of said bridges and said supply source of said amplifier corresponding to said other bridge being floatingly mounted and said supply means being floatingly connected between said third apices of said bridges.

References Cited
UNITED STATES PATENTS

| | | |
|---|---|---|
| 3,002,391 | 10/1961 | Holmes. |
| 3,124,961 | 3/1964 | Bedford. |
| 3,153,351 | 10/1964 | Holmes. |

FOREIGN PATENTS

| | | |
|---|---|---|
| 1,366,783 | 6/1964 | France. |
| 880,361 | 10/1961 | Great Britain. |

JAMES J. GILL, Primary Examiner